United States Patent
Kim et al.

(10) Patent No.: US 11,715,280 B2
(45) Date of Patent: Aug. 1, 2023

(54) OBJECT DETECTION DEVICE AND CONTROL METHOD

(71) Applicant: KYUNGPOOK NATIONAL UNIVERSITY INDUSTRY-ACADEMIC COOPERATION FOUNDATION, Buk-gu Daegu (KR)

(72) Inventors: Min Young Kim, Suseong-Gu Daegu (KR); Byeong Hak Kim, Buk-Gu Daegu (KR); Jong Hyeok Lee, Gyeongsan-si (KR)

(73) Assignee: KYUNGPOOK NATIONAL UNIVERSITY INDUSTRY-ACADEMIC COOPERATION FOUNDATION, Seoul (KR)

( * ) Notice: Subject to any disclaimer, the term of this patent is extended or adjusted under 35 U.S.C. 154(b) by 438 days.

(21) Appl. No.: 17/263,535

(22) PCT Filed: Aug. 1, 2019

(86) PCT No.: PCT/KR2019/009625
§ 371 (c)(1),
(2) Date: Jan. 26, 2021

(87) PCT Pub. No.: WO2020/027607
PCT Pub. Date: Feb. 6, 2020

(65) Prior Publication Data
US 2021/0182589 A1      Jun. 17, 2021

(30) Foreign Application Priority Data
Aug. 1, 2018    (KR) .......................... 10-2018-0089778

(51) Int. Cl.
*G06V 10/25* (2022.01)
*G06N 3/04* (2023.01)
(Continued)

(52) U.S. Cl.
CPC ............... *G06V 10/25* (2022.01); *G06N 3/04* (2013.01); *G06N 3/08* (2013.01); *G06V 10/50* (2022.01); *G06V 10/764* (2022.01); *G06V 10/82* (2022.01)

(58) Field of Classification Search
CPC ...... G06V 10/25; G06V 10/50; G06V 10/764; G06V 10/82; G06N 3/04; G06N 3/08;
(Continued)

(56) References Cited

U.S. PATENT DOCUMENTS 6,606,614 B1 *    8/2003  Paillet ................... G06N 3/063
                                                                706/41
10,769,485 B2 *   9/2020  Yang ...................... G06N 3/045
(Continued)

FOREIGN PATENT DOCUMENTS

KR    20020062557 A    7/2002
KR    20130032856 A    4/2013
(Continued)

OTHER PUBLICATIONS

Nakahara, H., et al., "Lightweight YOLOv2: A Binarized CNN with A Parallel Support Vector Regression for an FPGA", FPGA'18, Feb. 25-27, 2018, Monterey, CA, USA.*
(Continued)

*Primary Examiner* — Xuemei G Chen
(74) *Attorney, Agent, or Firm* — Steinfl + Bruno LLP (57) ABSTRACT

Disclosed are an object detection device and a control method. A method for controlling an object detection device comprises the steps of: receiving one image; dividing the received image into a predetermined number of local areas
(Continued)

on the basis of the size of a convolutional layer of a convolution neural network (CNN); identifying small objects at the same time by inputting a number of the divided local areas corresponding to the number of CNN channels to each of a plurality of CNN channels; sequentially repeating the identifying of the small objects for each of the remaining divided local areas; selecting MM mode or MB mode; setting an object detection target area corresponding to the number of CNN channels on the basis of the selected mode; and detecting the small objects at the same time by inputting each set object detection target area to each of the plurality of CNN channels.

12 Claims, 11 Drawing Sheets

(51) Int. Cl.
  *G06N 3/08* (2023.01)
  *G06V 10/50* (2022.01)
  *G06V 10/764* (2022.01)
  *G06V 10/82* (2022.01)

(58) Field of Classification Search
  CPC .. G06N 3/045; G06T 5/50; G06T 7/10; G06T 7/254; G06T 2207/20084; G06T 2210/12; G06T 2207/20224
  See application file for complete search history.

(56) References Cited

U.S. PATENT DOCUMENTS

| | | | |
|---|---|---|---|
| 2002/0136449 A1 | 9/2002 | Park et al. | |
| 2004/0086046 A1* | 5/2004 | Ma | G06T 7/215 375/240.16 |
| 2013/0057639 A1* | 3/2013 | Ralston | H04N 21/2405 348/14.02 |
| 2016/0210528 A1* | 7/2016 | Duan | G06V 20/46 |
| 2017/0011281 A1* | 1/2017 | Dijkman | G06V 10/255 |
| 2017/0169313 A1 | 6/2017 | Choi et al. | |
| 2017/0200279 A1* | 7/2017 | Zhong | G06T 7/194 |
| 2017/0262995 A1* | 9/2017 | Li | G06N 3/044 |
| 2018/0114334 A1* | 4/2018 | Desai | G06V 10/82 |
| 2018/0129902 A1* | 5/2018 | Li | G06T 7/246 |
| 2018/0268234 A1* | 9/2018 | Yang | G06F 18/2413 |
| 2018/0285656 A1* | 10/2018 | Yano | G06V 10/764 |
| 2018/0295273 A1* | 10/2018 | Li | G06V 10/25 |
| 2018/0330393 A1* | 11/2018 | Lipkowitz | G06T 7/11 |
| 2019/0066331 A1* | 2/2019 | Kahle | G06T 7/248 |
| 2019/0114804 A1* | 4/2019 | Sundaresan | G06T 7/74 |
| 2019/0279052 A1 | 9/2019 | Han et al. | |

FOREIGN PATENT DOCUMENTS

| | | |
|---|---|---|
| KR | 20160037643 A | 4/2016 |
| KR | 20160064831 A | 6/2016 |
| KR | 20160072768 A | 6/2016 |
| KR | 101709085 B1 | 2/2017 |
| KR | 20170070715 A | 6/2017 |

OTHER PUBLICATIONS

International Search Report for International Application No. PCT/KR2019/009625 filed on Aug. 1, 2019 on behalf of Kyungpook National University dated Nov. 18, 2019 (English + Original) 5 pages.
Kang M-S. et al., "Object Detection and Semantic Segmentation based on ExtendNet" Korean Society of Automotive Engineers, 2018, 7 pages (English Abstract + Original).
Korean Decision to Grant for KR Application No. 1020180089778 filed on Aug. 1, 2018 on behalf of Kyungpook National University dated Nov. 15, 2019 6 pages (English + Original).
Li G. et al., "Visual Saliency Detection Based on Multiscale Deep CNN Features" IEEE Transactions on Image Processing, vol. 25, Issue 11, Nov. 2016, pp. 5012-5024.
Written Opinion for International Application No. PCT/KR2019/009625 filed on Aug. 1, 2019 on behalf of Kyungpook National University dated Nov. 18, 2019 (English + Original) 8 pages.
Zhao R. et al., "Saliency Detection by Multi-Context Deep Learning" IEEE Conference on Computer Vision and Pattern Recognition, Jun. 2015, pp. 1265-1274.
Zhao Z-Q. et al., "Object Detection with Deep Learning: A Review" Journal of Latex Class Files, vol. 14, Mar. 2017, pp. 1-21.

\* cited by examiner

OBJECT DETECTION DEVICE AND CONTROL METHOD

CROSS REFERENCE TO RELATED APPLICATIONS

The present application is the U.S. national stage of International Application No. PCT/KR2019/009625 filed on Aug. 1, 2019, which, in turn, claims priority to Korean Application No. 10-2018-0089778 filed on Aug. 1, 2018, the contents of all of which are incorporated by reference in their entirety.

TECHNICAL FIELD

This disclosure relates to an object detection device and a control method thereof and, more particularly, to an object detection device for automatically detecting an ultra-small object in real time and a control method thereof.

BACKGROUND ART

In an electronic optical tracking system, object detection and cognitive performance are very important. Recently, the object detection and recognition function of an electronic optical tracking system is implemented based on deep learning. Even when the image resolution of the electronic optical tracking system is developed to be SXGA (1280× 1024) level or higher, there is a limitation that the deep learning based electronic optical tracking system may not detect a small object of a predetermined size or less due to limitation in an internal layer arrangement of a convolution neural network (CNN). If the internal layer arrangement of the CNN is extended so as to detect a small object of less than a predetermined size, an amount of data to be processed by the electronic optical tracking system becomes vast and there may be a problem that an object may not be detected in real time.

Therefore, there is a necessity for an object detection technology capable of detecting a small object while using a related-art CNN algorithm so as to detect an object in real time.

DISCLOSURE

Technical Problem

The disclosure has been made to solve the above-described problems, and an object of the disclosure is to provide an object detection device capable of detecting a small object in real time and a control method thereof.

Technical Solution

According to an embodiment, a method for controlling an object detection device includes receiving one image, dividing the received image into a predetermined number of local areas based on a size of a convolutional layer of a convolution neural network (CNN), identifying a small object at the same time by inputting a number of the divided local areas corresponding to the number of CNN channels to each of a plurality of CNN channels, sequentially repeating the identifying of the small objects for each of the remaining divided local areas, selecting a moving saliency map (MM) mode or a maximum bounding box (MB) mode, setting an object detection target local area corresponding to the number of CNN channels based on the selected mode, and detecting the small object at the same time by inputting each set object detection target local area to each of the plurality of CNN channels.

The setting an object detection target local area may include, based on an MB mode being selected, setting a bounding box to an identified small object, generating a bounding box map based on the number of bounding boxes, and setting the object detection target local area in a descending order of local area including a lot of bounding boxes based on the generated bounding box map.

The setting the object detection target local area may include, based on the MM mode being selected, identifying a small object by receiving a next image, generating a saliency map based on a difference image between the input next image and the input one image, and setting an object detection target local area in a descending order of a local area including a wide saliency area based on the generated saliency map.

The setting the object detection target local area may include obtaining the difference image after correcting a camera motion component of the input next image based on the input one image so that the difference image is stabilized.

The dividing may include dividing so that a boundary portion of each local area overlaps with a boundary portion of a neighboring local area to prevent a detection error of the small object located at a boundary portion of each local area.

The method my further include displaying a detected small object.

An object detection device according to an embodiment includes a camera configured to capture and receive one image and a processor configured to divide the received image into a predetermined number of local areas based on a size of a convolutional layer of a convolution neural network (CNN), and the processor may identify a small object at the same time by inputting a number of the divided local areas corresponding to the number of CNN channels to each of a plurality of CNN channels, sequentially repeat the identifying of the small objects for each of the remaining divided local areas, set an object detection target local area corresponding to the number of CNN channels based on the selected moving saliency map (MM) mode or a maximum bounding box (MB) mode, and detect the small object at the same time by inputting each set object detection target local area to each of the plurality of CNN channels.

The processor may, based on an MB mode being selected, set a bounding box to an identified small object, generate a bounding box map based on the number of bounding boxes, and set the object detection target local area in a descending order of local area including a lot of bounding boxes based on the generated bounding box map.

The processor may, based on the MM mode being selected, identify a small object by receiving a next image, generating a saliency map based on a difference image between the input next image and the input one image, and set an object detection target local area in a descending order of a local area including a wide saliency area based on the generated saliency map.

The processor may obtain the difference image after correcting a camera motion component of the input next image based on the input one image so that the difference image is stabilized.

The processor may divide so that a boundary portion of each local area overlaps with a boundary portion of a neighboring local area to prevent a detection error of the small object located at a boundary portion of each local area.

The object detection device may further include a display configured to display a detected small object.

Effect of Invention

As described above, according to various embodiments, an object detection device and a control method may detect a small object in real time.

The object detection device and control method may increase frames per second (FPS) by searching on the main region of interest of a screen according to two modes.

The object detection device and a control method may reduce a false alarm for a moving object.

BEST MODE FOR CARRYING OUT THE INVENTION

Various embodiments will be described in detail with reference to the attached drawings. The embodiments described herein may be variously modified. Specific embodiments are depicted in the drawings and may be described in detail in the description of the disclosure. However, it is to be understood that the particular embodiments disclosed in the appended drawings are for ease of understanding of various embodiments. Therefore, it is intended that the invention not be limited to the particular embodiments disclosed in the accompanying drawings, but on the contrary, the intention is to cover all equivalents or alternatives falling within the spirit and scope of the disclosure.

Terms such as "first," "second," and the like may be used to describe various components, but the components should not be limited by the terms. The terms are used to distinguish a component from another.

It is to be understood that the terms such as "comprise" or "consist of" are used herein to designate a presence of a characteristic, number, step, operation, element, component, or a combination thereof, and do not to preclude a presence or a possibility of adding one or more of other characteristics, numbers, steps, operations, elements, components or a combination thereof. It will be understood that when an element is referred to as being "coupled" or "connected" to another element, there may be other elements in the middle, although it may be directly coupled or connected to the other element. In contrast, when an element is referred to as being "directly coupled to" or "directly connected to" another element, there are no elements present therebetween.

The term such as "module," "unit," "part," and so on may be used to refer to an element that performs at least one function or operation, and such element may be implemented as hardware or software, or a combination of hardware and software. Further, except for when each of a plurality of "modules," "units," "parts," and the like needs to be realized in an individual hardware, the components may be integrated in at least one module. A singular expression includes a plural expression, unless otherwise specified.

When it is decided that a detailed description for the known art related to the disclosure may unnecessarily obscure the gist of the disclosure, the detailed description may be shortened or omitted. While each embodiment may be implemented or operated independently, each embodiment may be implemented or operated in combination.

Figure 1:
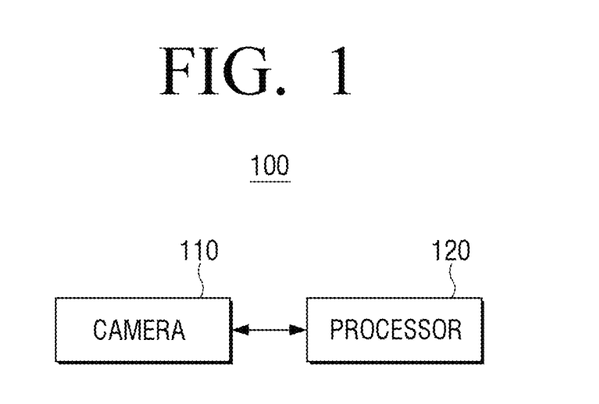
FIG. 1 is a block diagram of an object detection device according to an embodiment.

FIG. 1 is a block diagram of an object detection device according to an embodiment.

Referring to FIG. 1, an object detection device 100 may include a camera 110 and a processor 120. The camera 110 may capture an image and the object detection device 100 may receive the captured image. For example, the camera 110 may include a Forward Looking Infra Red (FLIR) camera, Electro Optic Infra Red (EO/IR), Infra Red Search and Tracking system (IRST) for military use/battleship use, or video camera (e.g., closed circuit television (CCTV), thermal observation device (TOD)) for security monitoring, or the like. The resolution of the camera 110 may be greater than or equal to SXGA (1280×1024). The image captured by the camera 110 may be forwarded to the processor 120.

The processor 120 may divide an image forwarded from the camera 110 into a predetermined number of local areas based on a size of a convolutional layer of a convolution neural network (CNN). The processor 120 may identify the object by inputting the divided local areas to the CNN.

For example, the resolution of the input image may be 1280×1024 and the initial size of the convolutional layer of CNN may be 448×448. Since the related-art object detection device inputs an entire image to the CNN, the loss of the image data is inevitable. Thus, there is problem in that the related-art object detection device may not identify a small object below a specific size. However, the object detection device 100 of the disclosure may divide an input image into a local area based on the size of the convolutional layer, and input the divided local area to the CNN. For example, if the resolution of an input image is 1280×1024, the object detection device 100 of the disclosure may divide the image into nine local areas. The size of each local area may be approximately 427×342. The object detection device 100 of the disclosure may input a local area image of the size of 427×342 to the CNN for processing and thus, there is little loss, and may identify a small object which may not be identified in the related-art object detection device. In one embodiment, the small object may be an object of a size of about 36 pixels (6×6) at the SXGA resolution.

The object may include a person, a car, an animal, or a means of transportation, and may be specifically set, such as a person with a knife, a person with a gun, a tank, a deer, or the like. The object detection device 100 may have to identify a specific object at a specific location. Thus, in the object detection device 100, one or two specific objects may be set. The object detection device 100 may perform a learning process on the target object in advance to identify a specific object.

The related-art CNN includes three channels to process an image including the RGB component. However, the monitoring image camera or the thermal image camera may receive a monochrome image. Therefore, the object detection device 100 may simultaneously input three local areas to three channels of CNN to identify the object. The object detection device 100 may identify the object included in the entire local area by repeating the above-described process for each of the remaining divided local areas.

For example, as described above, the object detection device 100 may divide an input image into nine local areas. The object detection device 100 may identify an object included in 1-3 local areas by inputting 1-3 local areas to the three channels of CNN, respectively. The object detection device 100 may identify the object included in 4 to 6 local areas in the same manner as the data processing for 1-3 local areas is terminated for 1-3 local areas. The object detection device 100 may identify the object included in 7 to 9 local areas in the same manner, as the data processing for the local area of 4 to 6 is finished.

When the data processing for the entire local area is finished, the object detection device 100 may set the local area of the object detection target based on a moving saliency map (MM) mode or maximum bounding box (MB) mode. The MM mode refers to a mode to extract a saliency area of an object based on a difference image between one image and the next image, and generate a saliency map based on the extracted saliency area, and then set a local area of the object detection target based on the generated saliency map. The MB mode may set a bounding box to the identified object, and generate a bounding box map based on the set bounding box, and set the local area of the object detection target based on the generated bounding box map. The operation of the specific MM mode and the MB mode will be described later.

The object detection device 100 may detect an object at the same time by inputting each of the set object detection target local areas to the CNN channel. The object detection device 100 may repeat the object identification process for the entire local area again if the object included in the local area of the object detection target is detected and the preset time is exceeded.

Though not shown in FIG. 1, the object detection device 100 may further include a display, a communication interface, or a memory. The display may display the identified object in the entire image or display the detected object included in the local area of the object detection target. The communication interface may transmit, to an external device, an image captured by the camera 110, the identified object information in the entire image or the object image included in the set object detection target local area and detected. The memory may store the image captured by the camera 110, object information identified in the entire image, or object information included and detected in the set object detection target local area, and may store the data such as local area division information, setting time to identify an object for the entire local area, or the like, and software for performing the object detection process.

A specific object detection process will be described below.

Figure 2:
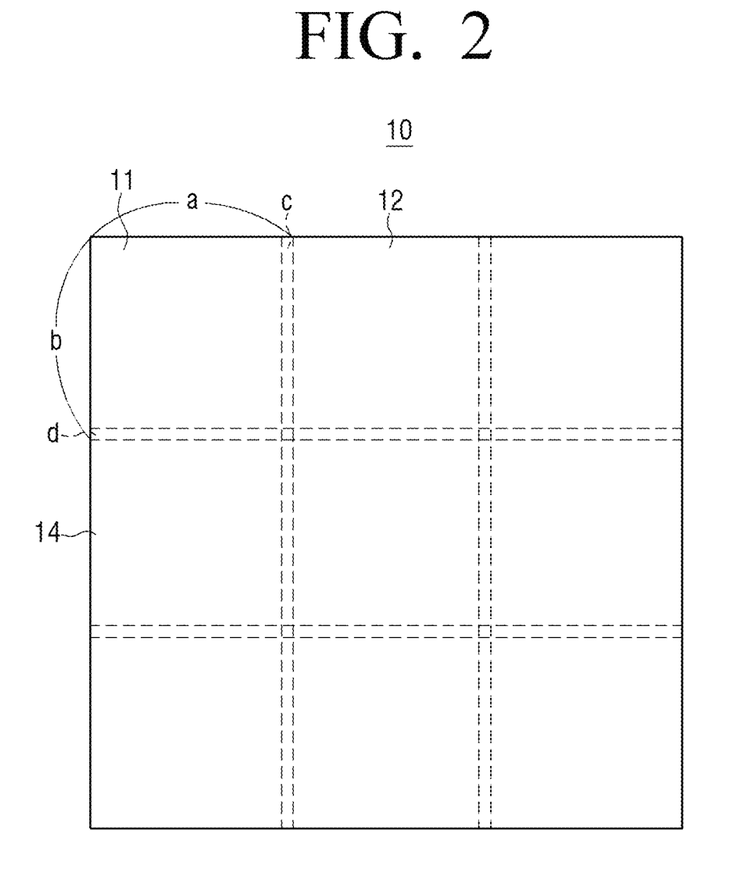
FIG. 2 is a diagram illustrating a method of dividing an image according to an embodiment.

FIG. 2 is a diagram illustrating a method of dividing an image according to an embodiment.

Referring to FIG. 2, an image 10 divided into a local area is shown. The object detection device divides the input image 10 into a local area based on the size of a convolutional layer of CNN. For example, the initial size of the convolutional layer may be 448×448 and the size of the input image 10 may be 1280×1024. The object detection device may divide the input image 10 into nine local areas based on the size of the convolutional layer. The size of the divided local area may be approximately 427×342. The object detection device may set the number of divided local areas according to the size of a convolutional layer of CNN applied. For example, if the size of the convolutional layer of the CNN is 640×512, the object detection device having the resolution of the SVGA may divide the input image into four local areas. The size of the divided local area may be approximately 640×512. If the size of the convolutional layer of CNN is 224×224, the object detection device having the resolution of the SVGA may divide the input image into 25 local areas. The size of the divided local area may be approximately 256×205.

The object detection device may divide the input image 10 so that a boundary portion of each local area overlaps with a boundary portion of an adjacent local area. As shown in FIG. 2, first local area 11 may be divided into a size of a×b. The c area of the first local area may be overlapped with a second local area 12, and the d area may be overlapped with a fourth local area 14. If the local area is divided without overlapping areas, the object detection device may not identify the object located in the boundary portion of the local area. Therefore, the object detection device may identify an object located in a boundary portion of the local area without a problem by dividing the input image 10 into a local area where the boundary part is overlapped. The object detection device may divide the boundary portion of each local area to overlap with the boundary portion of the neighboring local area to prevent the detection error of an object located in the boundary portion of each local area.

Figure 3:
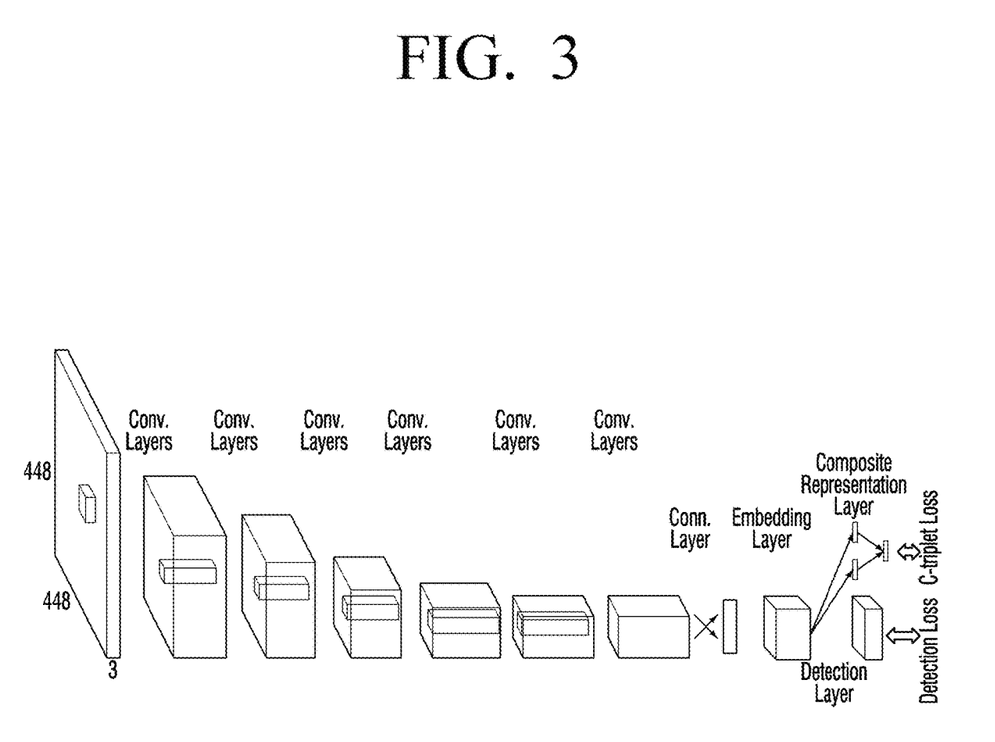
FIG. 3 is a diagram illustrating a CNN applied to a related-art object detection device.

FIG. 3 is a diagram illustrating a CNN applied to a related-art object detection device.

The CNN applied to the related-art object detection device may include a plurality of convolutional layers, a connection layer, an embedding layer, a composite representation layer, a detection layer, or the like. Since the CNN shown in FIG. 3 is applied to a related-art object detection device, detailed descriptions thereof are omitted. A general CNN applied to a related-art object detection device may include three channels to process the RGB data. The three channels may process R, G, and B data, respectively. The object detection device may quickly process an image while using CNN applied to a related-art object detection device. Hereinbelow, the CNN structure applied to an object detection device will be described.

Figure 4:
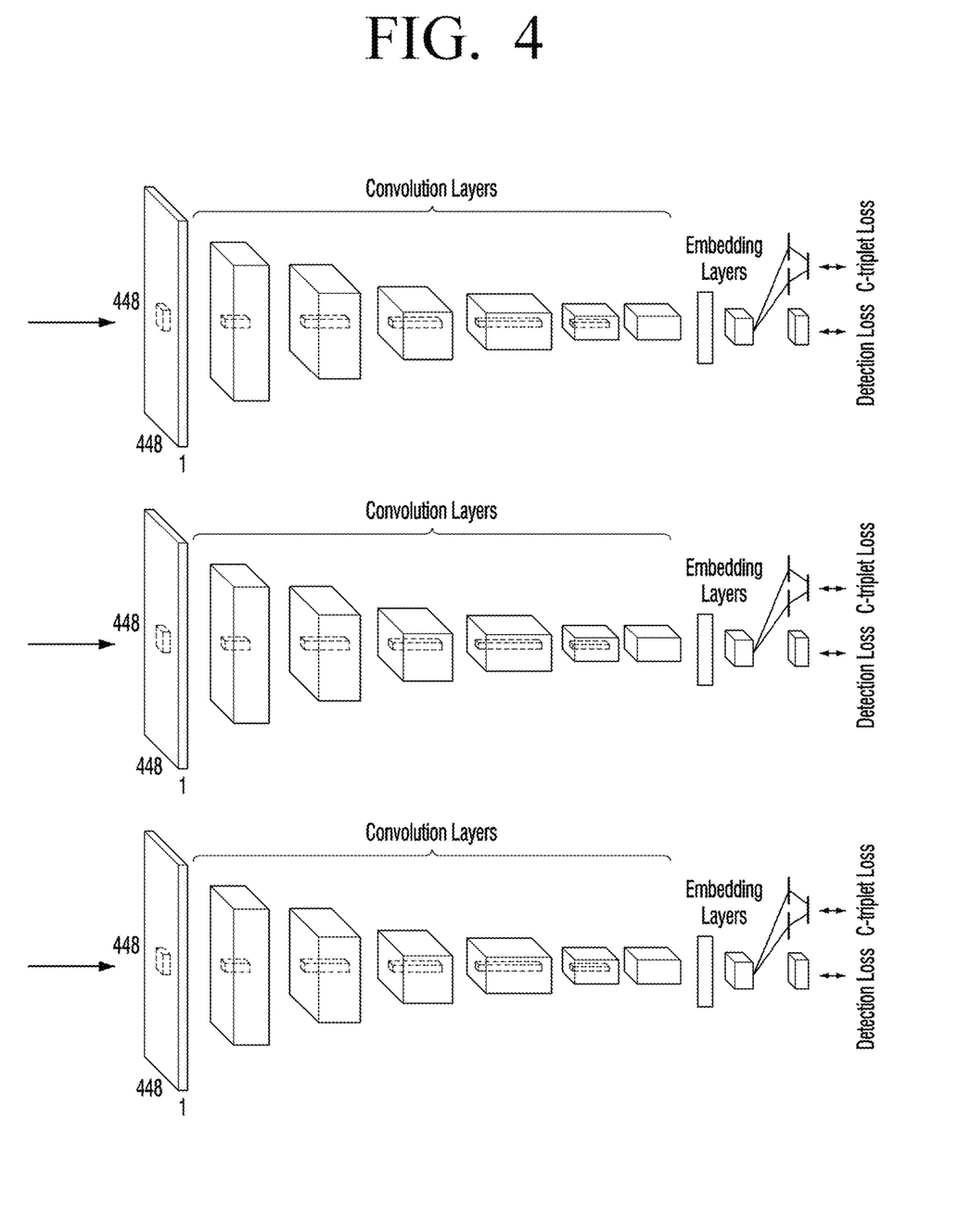
FIG. 4 is a diagram illustrating a CNN according to an embodiment.

FIG. 4 is a diagram illustrating a CNN according to an embodiment.

The structure of CNN applied to an object detection device is similar to the CNN structure applied to an existing object detection device. However, since the monitoring image camera or the thermal image camera may receive monochrome images, the plurality of channels of the CNN to process the RGB data may process one local area data. In other words, when an object detection device divides one image into nine local areas, each channel of the CNN may process the local area data of first to third local area data to identify the object. When the first to third local area data processing ends, each channel of the CNN may process fourth to sixth local area data to identify the object. If the fourth to sixth local area data processing ends, each channel of CNN may process seventh to ninth local area data to identify the object. In other words, the object detection device may simultaneously identify an object by inputting a divided local area to each of a plurality of CNN channels.

The object detection device may sequentially repeat the processes described above with respect to each of the remaining local areas.

The object detection device may set an object detection target local area according to the MM mode or the MB mode. In the above-described example, an object detection device may set three local areas as object detection target local areas. The object detection device may simultaneously detect an object by inputting each of the three local areas set to the object detection target local area to each of the CNN channels.

Therefore, the object detection device may perform object detection by modifying the processing of a related-art object detection device and thus advantageous in compatibility, and may identify a small object by processing data by dividing local areas based on the size of the CNN convolutional layer and may detect an object targeting the object detection target local area, thereby having an effect to detect the object quickly in real time.

If the image input by the camera has the RGB component, the same process may be performed by applying the three general CNNs as described in FIG. 3. When the input image has an RGB component, the process of identifying the object included in all local areas of the input image may take a lot more time than identifying the object included in the monochrome image. However, the object detection device may detect an object faster than a related-art approach because the object detection target local area is set to detect an object.

The operations of the MM mode and the MB mode will be described below.

Figure 5:
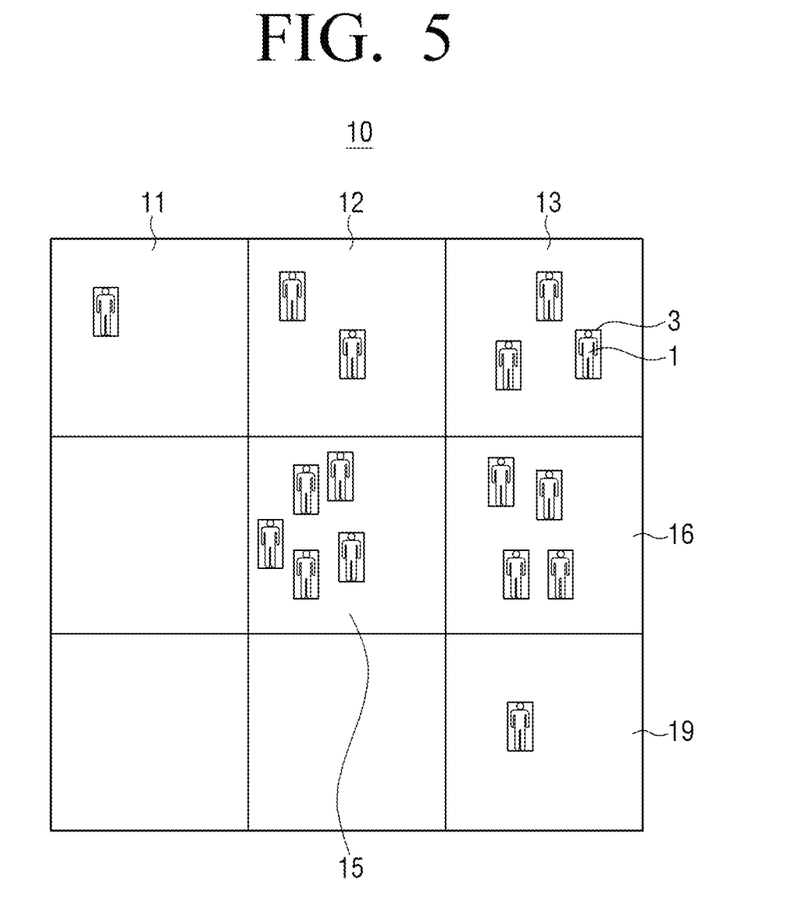
FIG. 5 is a diagram illustrating a bounding box map according to an embodiment.

FIG. 5 is a diagram illustrating a bounding box map according to an embodiment.

Referring to FIG. 5, an input image 10 divided into local areas is illustrated. As described above, the object detection device divides the input image 10 into a predetermined number of local areas. The object detection device may identify an object 1 included in each local area through CNN. When the MB mode is selected, the object detection device may set a bounding box 3 to each of the identified objects 1. The MB mode refers to a mode for setting an object detection target local area based on the number of the bounding boxes by setting a bounding box to the identified object. The object detection device may generate a bounding box map in which the bounding box 3 is set for an input image divided into a local area. The object detection device may identify the number of the bounding boxes set in each local area. The object detection device may set the object detection target local area in a descending order of a local area including a larger number of bounding boxes based on the number of the bounding boxes of each local area included in the bounding box map.

As shown in FIG. 5, the object detection device may divide the input image 10 into nine local areas, and generate a bounding box map in which the bounding box 3 is set to each of the objects 1 identified in each local area. The object detection device may identify the number of bounding boxes as one in the first local area 11, two in the second local area 12, three in the third local area 13, five in the fifth local area 15, four in the sixth local area 16, and one in the ninth local area 19. In the object detection device, the number of object detection target local area may be set to three. Therefore, the object detection device may set the fifth local area 15, sixth local area 16, and the third local area 13 in the descending order of a local area including larger number of bounding boxes as the object detection target local areas. The object detection device may detect an object by inputting the data of fifth local area 15, sixth local area 16, and the third local area 13 to each channel of CNN.

The object detection device may detect an object in the MB mode through the above process. Hereinbelow, the operation process of the MM mode will be described.

Figure 6:
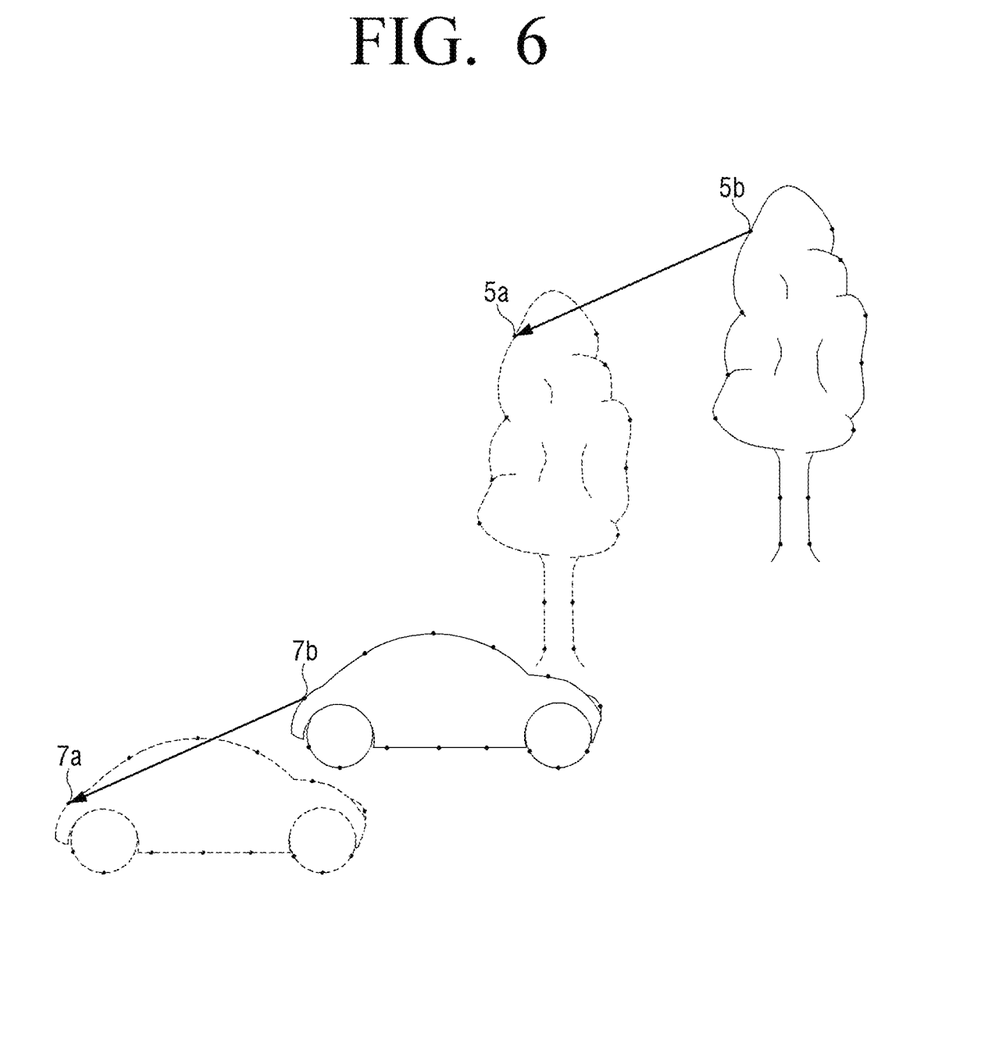
FIG. 6 is a diagram illustrating a method for correcting a motion component of camera according to an embodiment.

FIG. 6 is a diagram illustrating a method for correcting a motion component of camera according to an embodiment.

The MM mode may refer to a mode of setting an object detection target local area based on a space of a saliency area by extracting the saliency area of the object based on a difference image between one image and the next image. The object detection device may perform a process of correcting a motion component of a camera when extracting a saliency area through a difference image.

Referring to FIG. 6, an object (tree, car) included in an input image is shown. An object of a previous image is a tree and a car indicated by a dotted line, and an object of the next image is a tree and a vehicle displayed by a solid line. The object detection device may extract feature points 5a and 7a in an object of a previous image, and extract feature points 5b, 7b in an object of the next image. The object detection device may calculate a corresponding relation of the feature points extracted from each of the previous image and the next image. When the corresponding relation of the extracted feature points indicates a predetermined direction and distance, the object detection device may identify that a camera is moved. The object detection device may move the object of the next image based on the corresponding relation.

As shown in FIG. 6, when the relation between the feature points 5a and 5b of a tree included in two images and the feature points 7a and 7b of a car included in the two images are similar to each other, the object detection device may identify that the camera is moved, and may correct the position of the object of the previous image, or correct the position of the object of the next image. The object detection device may obtain a difference image between the input previous image and the next image. When the movement of the camera is corrected, a stabilized difference image may be obtained. The object detection device may obtain a difference image after correcting the camera motion component of the next image input based on one image input to stabilize the difference image.

Figure 7:
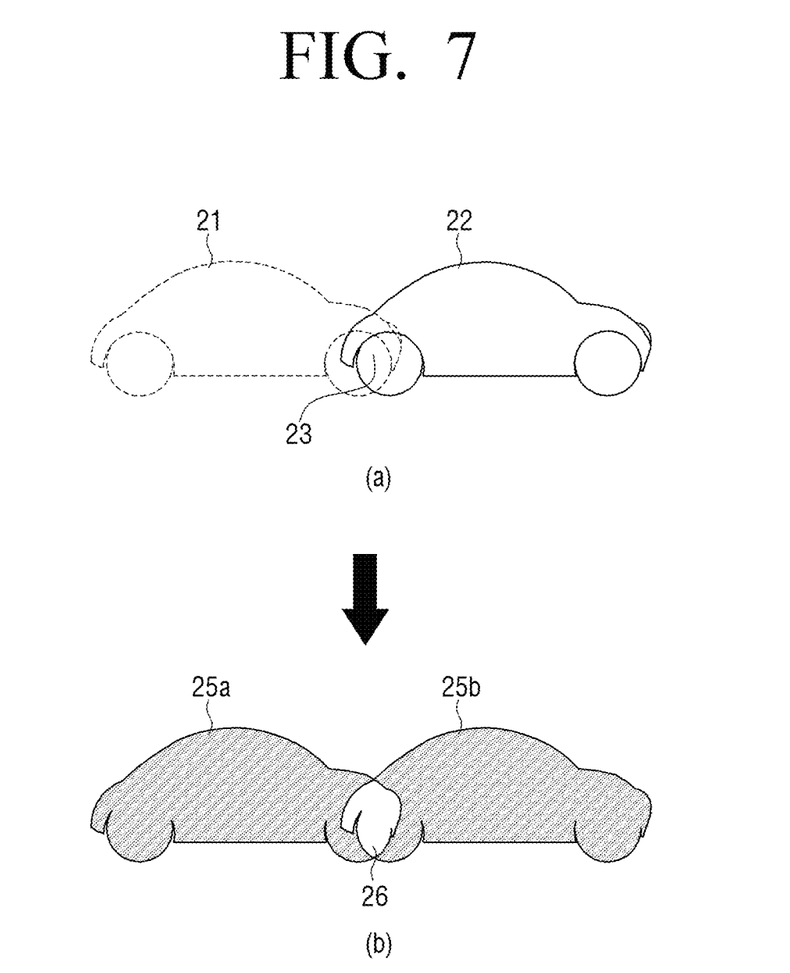
FIG. 7 is a diagram illustrating a saliency area according to an embodiment.

FIG. 7 is a diagram illustrating a saliency area according to an embodiment.

Referring to FIG. 7A, a car included in a previous image and a car included in the next image are shown. In the state where the motion component of the camera is corrected, the car may move by a certain distance. The object detection device may generate a difference image of the next image and the previous image. In other words, the second area 22 of the car area included in the next image is an area included only in the next image, and the first area 21 among the areas of the car included in the previous image is the area included only in the previous image. The third area 23 is an area included in both the previous image and the next image. If a difference image of a next image and a previous image is generated, the third area 23 may be removed.

Referring to FIG. 7B, a saliency area generated by a difference image is shown. That is, a saliency area in which a first area 25a and a second area 25b included in the previous image and the next image by the difference image are left, and an overlapped third area 26 is removed may be generated. The object detection device may set an object detection target local area based on the saliency area of the target object included in each local area.

Figure 8:
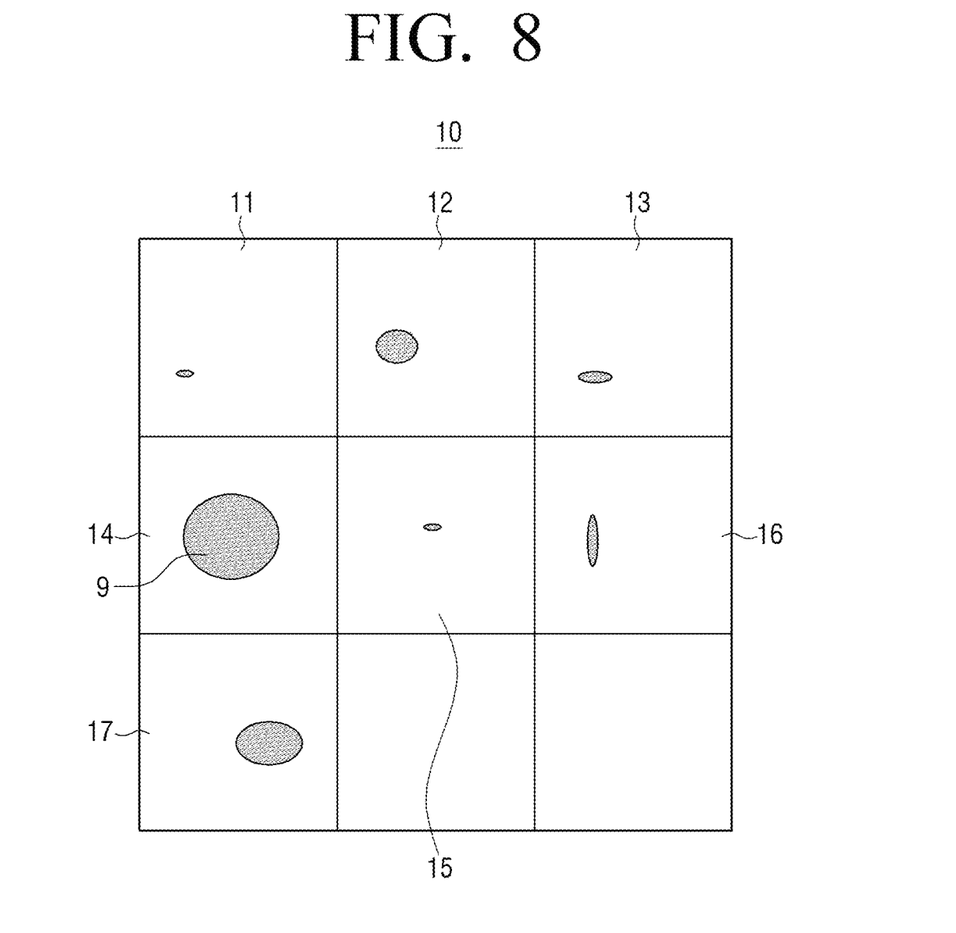
FIG. 8 is a diagram illustrating a saliency map according to an embodiment.

FIG. 8 is a diagram illustrating a saliency map according to an embodiment.

Referring to FIG. 8, a saliency map in which a saliency area is displayed on the input image 10 divided into local areas is illustrated.

As shown in FIG. 8, the object detection device may divide the input image 10 into nine local areas, and may generate a saliency map in which the saliency area 9 is displayed in each local area. In the example of FIG. 8, by the difference image of the previous image and the next image, the saliency map may display the saliency area on first local area 11, second local area 12, third local area 13, fourth local area 14, fifth local area 15, sixth local area 16, and seventh local area 17. In the object detection device, the number of object detection target local areas may be set to three. The object detection device may set the fourth local area 14, sixth local area 16, and the second local area 12 as the object detection target local areas in a descending order of width of the saliency area. The object detection device may detect an object by inputting data of fourth local area 14, sixth local area 16, and second local area 12 to each channel of CNN.

Various embodiments of detecting an object by the object detection device have been described. A method for controlling the object detection device will be described below.

Figure 9:
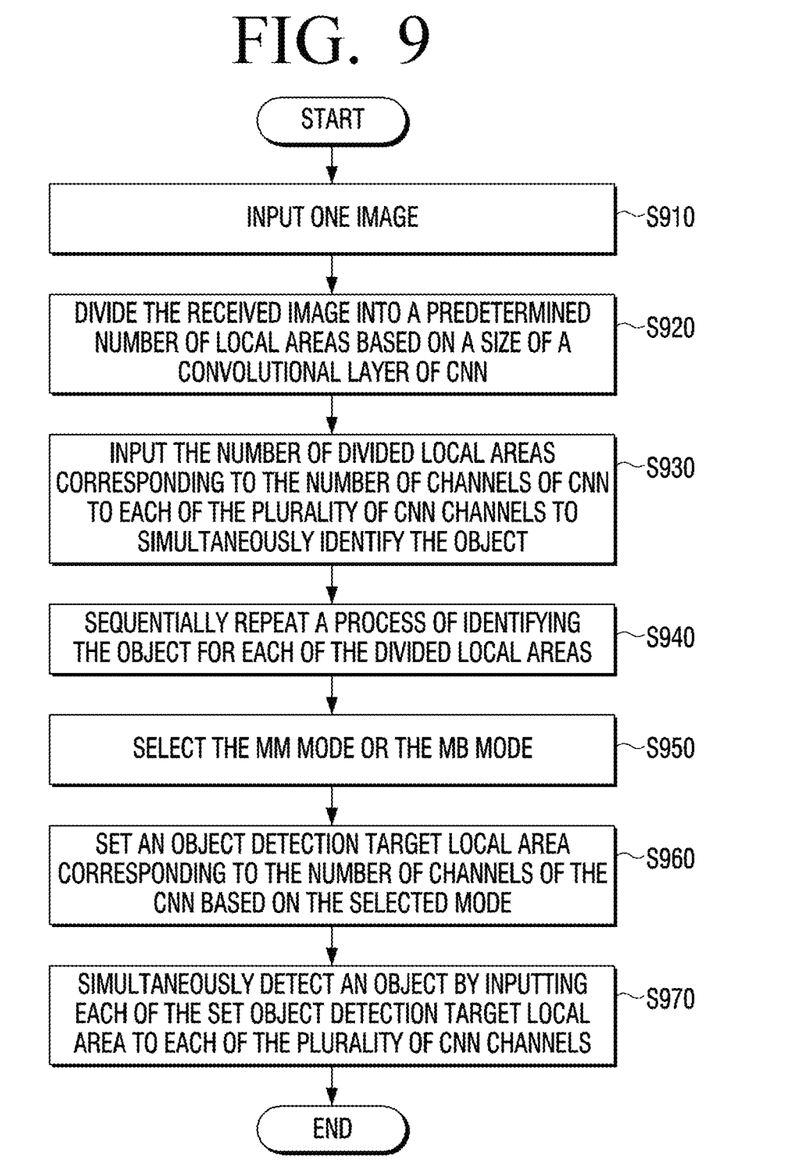
FIG. 9 is a flowchart of a method for controlling an object detection device according to an embodiment.

FIG. 9 is a flowchart of a method for controlling an object detection device according to an embodiment.

The object detection device may receive one image in operation S910. The object detection device may receive an image through a camera. For example, the camera 110 may include a Forward Looking Infra Red (FLIR) camera, Electro Optic Infra Red (EO/IR), Infra Red Search and Tracking system (IRST) for military use/battleship use, or video camera (e.g., closed circuit television (CCTV), thermal observation device (TOD)) for security monitoring, or the like. The resolution of the camera may be greater than or equal to SXGA (1280×1024).

The object detection device may divide an input image into a predetermined number of local areas based on the size of a convolutional layer of CNN in operation S920. For example, if the initial size of the convolutional layer is 448×448 and the size of the input image 10 is 1280×1024, the object detection device may divide the input image into nine local areas. The size of the divided local area may be approximately 427×342. The object detection device may divide a boundary portion of each local area to overlap with a boundary portion of an adjacent local area.

The object detection device may input the number of divided local areas corresponding to the number of channels of CNN to each of the plurality of CNN channels to simultaneously identify the object in operation S930, and may sequentially repeat a process of identifying the object for each of the divided local areas in operation S940. For example, if the channel of the CNN is three and the object detection device divides an input image into nine local areas, the object detection device may input the data of the first to third local areas to each CNN channel to simultaneously identify the object. The object detection device may perform the above-described process to sequentially identify the object by sequentially inputting the data of the four to six local areas and the data of the sixth to ninth local areas to the CNN channel.

The object detection device may receive the MM mode or the MB mode in operation S950. The MM mode is a mode for generating a saliency map based on a difference image between the previous image and the next image, and setting an object detection target local area based on the saliency map. The MB mode is a mode for generating a bounding box map set by the bounding box to the identified object, and setting a local area of the object detection target based on the bounding box map.

The object detection device may set an object detection target local area corresponding to the number of channels of the CNN based on the selected mode in operation S960. For example, the number of channels of the CNN may be three, and the object detection device may set three object detection target local areas according to criterion by each mode. The object detection device may simultaneously detect an object by inputting each of the set object detection target local area to each of the plurality of CNN channels in operation S970.

Figure 10:
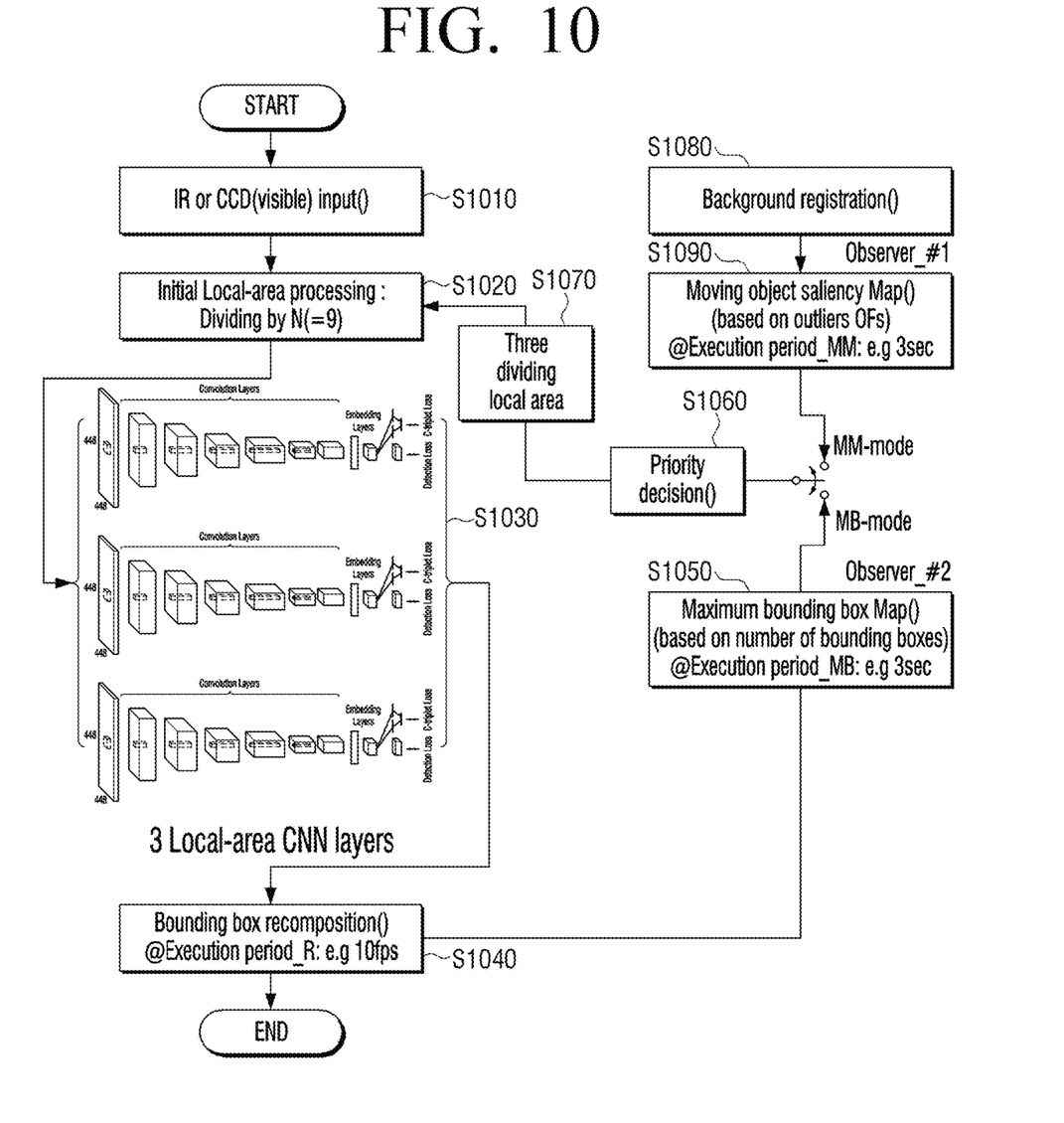
FIG. 10 is a diagram illustrating a process of controlling an object detection device according to an MM mode and an MB mode according to an embodiment.

FIG. 10 is a diagram illustrating a process of controlling an object detection device according to an MM mode and an MB mode according to an embodiment.

The object detection device may receive an image through a camera in operation S1010. The object detection device may divide an input image into a preset local area in operation S1020. The object detection device may divide an input image into a local area based on a size of a convolutional layer of CNN. For example, if the resolution of the input image is 1280×1024 and the size of the convolutional layer of CNN is 448×448, the object detection device may divide the inputted image into nine local areas.

The object detection device may detect an object by inputting one local area data to each channel of the CNN in operation S1030. The channel of CNN may be three, and the object detection device may simultaneously process three local area data. The object detection device may sequentially process the remaining six local area data in the same manner.

In the MB mode, the object detection device may set a bounding box to an object included in each local area in operation S1040. The object detection device may newly set the boxing box every predetermined time. For example, the object detection device may set a new bounding box to an object included in an image every ten frames. The object detection device may divide the entire input image into nine local areas every ten frames, and may simultaneously and sequentially input all local area data to the CNN to identify the object. In the MB mode, the object detection device may set the bounding box to the object.

The object detection device may generate a bounding box map including a bounding box in operation S1050. The object detection device may newly generate a boxing box map every predetermined time. For example, the object detection device may newly generate a boxing box map every three seconds.

The object detection device may set an object detection target local area in the MB mode based on the bounding box map and the priority in operations S1060 and S1070. The object detection device may set the object detection target local area in the descending order of the number of the bounding boxes included in each local area. For example, the object detection device may set the number of object detection target local areas to three, and as or the object detection target local area, may set three local areas in the descending order of the number of bounding boxes included in each local area as the object detection target local area.

The object detection device may input the set object detection target local area to each channel of CNN to detect an object.

In the MM mode, the object selection device may receive the next image in operation S1080. The object detection device generates a saliency map in operation S1090. The object detection device may extract the saliency area of an object through the difference image of the previous image and the next image. The object detection device may generate a saliency map including the saliency area in each local area. The object detection device may newly generate a saliency map every set time. For example, the object detection device may generate a new saliency map every three seconds. The object detection device may perform the camera correction process before generating a saliency map.

The object detection device may set an object detection target local area based on the saliency map and the priority in the MM mode in operation S1060 and S1070. The object detection device may set an object detection target local area in a descending order of width of the saliency area included in each local area. For example, in the object detection device, the number of object detection target local area may be set to three, and the object detection target local area may set three local areas as the object detection target local areas in a descending order of width of the saliency area included in each local area.

The object detection device may include the set object detection target local area to each channel of CNN to detect an object.

Figure 11:
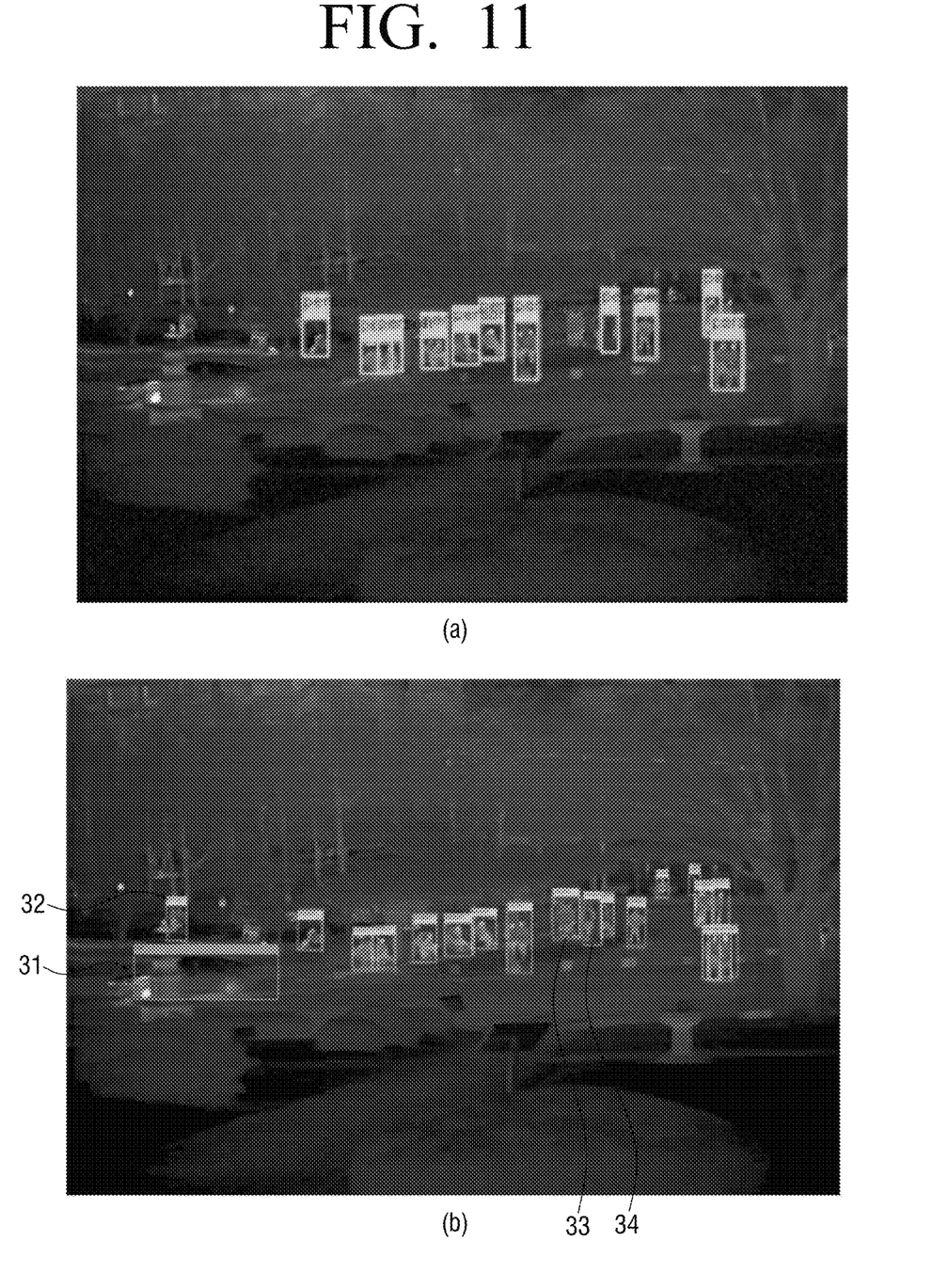
FIG. 11 is a diagram illustrating an object detection image according to a related art and an object detection image according to the disclosure.

FIG. 11 is a diagram illustrating an object detection image according to a related art and an object detection image according to the disclosure.

Referring to FIG. 11A, an object detection image according to the related-art is illustrated, and referring to FIG. 11B, an object detection image according to the disclosure is illustrated. The object detection image according to the disclosure includes objects 31, 32, 33, 34 that are not detected in a manner of the related art.

The related-art object detection method may detect an object of at least about 256 pixels (16×16) at the SXGA resolution. However, the object detection method may detect a small object of about 36 pixels (6×6) at the SXGA resolution. Since the existing method detects an object by processing the entire data of the image, there is a disadvantage that an FPS is small and a false alarm is large when a moving object is detected. The object detection method may selectively apply two modes according to a situation or an object and detect an object based on an area of interest so that the FPS increases and a false alarm for a moving object is small.

The object detection device may be applied to a military weapon system (a camera for an aircraft and a drone), a security (an observation equipment for military use, CCTV), a medical field or a vision inspection equipment, or the like.

The method for controlling an object detection device according to various embodiments described above may be provided as a computer program product. The computer program product may include a non-transitory computer readable medium having a software (S/W) program itself or an S/W program stored thereon.

A non-transitory computer-readable medium refers to a medium that stores data semi-permanently, rather than a medium that stores data for a short moment, such as a register, cache, memory, etc., and refers to a medium readable by a device. Specifically, the programs for performing the various methods described above may be stored and provided in a non-transitory readable medium, such as a compact disc (CD), a digital video disc (DVD), a hard disk, a Blu-ray disc, a universal serial bus (USB), a memory card, a read-only memory (ROM), etc.

While the disclosure has been shown and described with reference to various example embodiments thereof, it will be understood by those skilled in the art that various changes in form and details may be made therein without departing from the spirit and scope of the disclosure as defined by the appended claims and their equivalents.

What is claimed is:

1. A method for controlling an object detection device, the method comprising:
   receiving one image;
   dividing the received image into a predetermined number of local areas based on a size of a convolutional layer of a convolution neural network (CNN);
   identifying a small object at the same time by inputting a number of the divided local areas to each of a plurality of CNN channels, the number of the inputted local areas corresponding to the number of CNN channels;
   sequentially repeating the identifying of the small objects for each of the remaining divided local areas;
   selecting a moving saliency map (MM) mode or a maximum bounding box (MB) mode;
   setting an object detection target local area corresponding to the number of CNN channels based on the selected mode; and
   detecting the small object at the same time by inputting each set object detection target local area to each of the plurality of CNN channels.

2. The method of claim 1, wherein the setting an object detection target local area comprises, based on an MB mode being selected, setting a bounding box to the identified small object, generating a bounding box map based on the number of bounding boxes, and setting the object detection target local area in order of the number of bounding boxes included in each of the local area based on the generated bounding box map.

3. The method of claim 1, wherein the setting the object detection target local area comprises, based on the MM mode being selected, identifying a small object by receiving a next image, generating a saliency map based on a difference image between the input next image and the input one image, and setting an object detection target local area in order of a saliency area included in each of the local area based on the generated saliency map.

4. The method of claim 3, wherein the setting the object detection target local area comprises obtaining the difference image after correcting a camera motion component of the input next image based on the input one image so that the difference image is stabilized.

5. The method of claim 1, wherein the dividing comprises dividing so that a boundary portion of each local area overlaps with a boundary portion of a neighboring local area to prevent a detection error of the small object located at the boundary portion of each local area.

6. The method of claim 1, further comprising:
   displaying the detected small object.

7. An object detection device comprising:
   a camera configured to capture and receive one image; and
   a processor configured to divide the received image into a predetermined number of local areas based on a size of a convolutional layer of a convolution neural network (CNN),
   wherein the processor is further configured to:
   identify a small object at the same time by inputting a number of the divided local areas to each of a plurality of CNN channels, the number of the inputted local areas corresponding to the number of CNN channels, sequentially repeat the identifying of the small objects for each of the remaining divided local areas, set an object detection target local area corresponding to the number of CNN channels based on the selected moving saliency map (MM) mode or a maximum bounding box (MB) mode, and detect the small object at the same time by inputting each set object detection target local area to each of the plurality of CNN channels.

8. The object detection device of claim 7, wherein the processor is further configured to, based on an MB mode being selected, set a bounding box to the identified small object, generate a bounding box map based on the number of bounding boxes, and set the object detection target local area in order of the number of bounding boxes included in each of the local area based on the generated bounding box map.

9. The object detection device of claim 7, wherein the processor is further configured to, based on the MM mode being selected, identify a small object by receiving a next image, generating a saliency map based on a difference image between the input next image and the input one image, and set an object detection target local area in order of a saliency area included in each of the local area based on the generated saliency map.

10. The object detection device of claim 9, wherein the processor is further configured to obtain the difference image after correcting a camera motion component of the input next image based on the input one image so that the difference image is stabilized.

11. The object detection device of claim 7, wherein the processor is further configured to divide so that a boundary portion of each local area overlaps with a boundary portion of a neighboring local area to prevent a detection error of the small object located at a boundary portion of each local area.

12. The object detection device of claim 7, further comprising:
a display configured to display the detected small object.

* * * * *